(12) United States Patent
Kakimoto et al.

(10) Patent No.: US 6,602,586 B2
(45) Date of Patent: *Aug. 5, 2003

(54) ELASTIC BLOCKS AND PROCESS FOR PRODUCING THE SAME

(75) Inventors: Hirofumi Kakimoto, Fukuyama (JP); Masanori Igaki, Fukuyama (JP)

(73) Assignee: Hayakawa Rubber Company Limited, Fukuyama (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/570,432

(22) Filed: May 12, 2000

(65) Prior Publication Data

US 2002/0015840 A1 Feb. 7, 2002

(30) Foreign Application Priority Data

Aug. 5, 1999 (JP) .............................. 11-222067

(51) Int. Cl.⁷ ................................ B32B 7/00
(52) U.S. Cl. ................. 428/213; 428/215; 428/327; 428/402; 428/423.9; 428/424.8; 428/492; 428/493
(58) Field of Search ................. 428/909, 327, 428/339, 402, 423.9, 424.8, 213, 492, 493, 215; 52/403.1; 15/215, 216; 5/417, 418, 419, 420; D06/582

(56) References Cited

U.S. PATENT DOCUMENTS

| | | | | | |
|---|---|---|---|---|---|
| 2,347,233 A | * | 4/1944 | Abernathy | ............... | 404/31 |
| 3,030,251 A | * | 4/1962 | Bore et al. | ............... | 156/249 |
| RE25,778 E | * | 5/1965 | Bore et al. | ............... | 427/203 |
| 3,801,421 A | * | 4/1974 | Allen et al. | ............... | 428/17 |
| 4,337,283 A | * | 6/1982 | Haas, Jr. | ............... | 428/17 |
| 5,094,905 A | * | 3/1992 | Murray | ............... | 428/218 |
| 5,100,704 A | * | 3/1992 | Iwakura et al. | ............... | 427/302 |
| 5,972,470 A | * | 10/1999 | Engst | ............... | 428/140 |

FOREIGN PATENT DOCUMENTS

| | | | |
|---|---|---|---|
| DE | 2654845 | * | 6/1978 |
| JP | 02-252511 A | * | 10/1990 |
| JP | 03-200851 A | * | 9/1991 |

OTHER PUBLICATIONS

Handbook of Refractions Tech—Princ, Types, Prop. and Appl (Carniglia, S. and Barna, G., Ed., Noyes Publications, 1992, pp. 25–26).*
Derwent Abstract Translation of JP 02–252511 A (Derwent Acc No: 1990–351256).*
Derwent Abstract Translation of JP 03–200851 A (Derwent Acc No: 1991–305661).*
Derwent Abstract Translation of DE 2654845 (Derwent Acc No: 1978–42386 A).*

* cited by examiner

*Primary Examiner*—Paul Thibodeau
*Assistant Examiner*—Kevin M. Bernatz
(74) *Attorney, Agent, or Firm*—Oliff & Berridge, PLC

(57) ABSTRACT

An elastic block, which is adapted to be paved on an underlying base for absorbing impacts, includes a laminate composed of a powdery rubber-containing layer and a vulcanized rubber layer underlying the powdery rubber-containing layer, the powdery rubber-containing layer being a compression molded layer composed of a mixture comprising elastic chips having the particle size of 0.5 to 10 mm and a resin binder, the vulcanized rubber layer being a vulcanized molding of an unvulcanized rubber layer, wherein the elastic chips are fixedly bonded to one another with the resin binder and the powdery rubber-containing layer is adhered to the vulcanized rubber layer when the mixture layer and the unvulcanized rubber layer are subjected to pressurization and vulcanization.

20 Claims, 5 Drawing Sheets

ELASTIC BLOCKS AND PROCESS FOR PRODUCING THE SAME

BACKGROUND OF THE INVENTION

1. Field of the Invention

The present invention relates to elastic blocks made of elastic materials which are to be used as pavement materials for underlining bases such as road bases and floor bases in pavements, promenades, bicycle roads, outdoor sport facilities, indoor sport facilities, squares and plazas, rooftops, club houses in golf courses, halls, passenger boats, public facilities, parks, schools, etc., and which are suitable for enhancing safety in cases where persons, particularly aged persons, infants and children fall.

2. Related Art Statement

The elastic pavement roads constituted by such elastic blocks have been frequently used in pavements, promenades, gymnastic facilities, jogging roads, pavements in golf courses.

As compared with interlocking blocks made of inorganic materials such as concrete, resinous mortar or tiles, the elastic blocks of the present invention are made of organic elastic pavement materials that are softer and, therefore, safer than the inorganic materials used in known interlocking blocks.

As the organic elastic pavement material, a water non-permeable elastic pavement material formed by spreading a polyurethane-based resin with a trowel or the like is known.

Further, water-permeable elastic blocks in which rubber chips obtained by grinding tires or the like are bound to one another with a synthetic resin binder such as a urethane resin are known.

FIG. 7 shows a sectional view of such a block. This block 61 includes a front-surface layer 64 and a rear-surface layer 65 in which rubber chips 66 and 67, obtained by grinding tires or the like, having respectively different dimensions are bound together using a synthetic resin binder, such as urethane resin, so that the resulting block exhibits excellent water permeability.

When a paved road is to be constructed by using such elastic blocks, the road is first paved with asphalt or concrete, the asphalt or the concrete is cured, and then a number of elastic blocks are paved on the cured layer, and entirely joined thereto with an adhesive, thereby forming the paved road.

The elastically paved road constructed by spreading the poly-urethane-based resin with the trowels has no water permeability. Such a paved road repels water, so that it causes pedestrians to slip or fall with staying water on walking, if the road has poor drainage.

On the other hand, the elastic blocks in which rubber chips obtained by grinding tires or the like are fixedly bound to one another with a synthetic resin binder such as a urethane resin have water permeability, so that they prevent water from staying at their surfaces. As a result, they have high safety and can enhance walk feeling, so that they are frequently used.

However, the present inventors found out that if such elastic blocks are used for a long time, their upper layer portions warped.

The upwardly warped blocks as a matter of course deteriorate the appearance of the paved road, and form steps at the warped portions, which cause pedestrians to stumble and fall and become safety problems.

SUMMARY OF THE INVENTION

The present invention is aimed at obtaining elastic blocks which can are prevented from being upwardly warped and have excellent safety and constructionability.

The present invention relates to an elastic block adapted to be paved on an underlying base for absorbing impacts, said elastic body comprising a laminate composed of a powdery rubber-containing layer and a vulcanized rubber layer underlying the powdery rubber-containing layer, said powdery rubber-containing layer being a compression molded layer composed of a mixture comprising elastic chips having the particle size of 0.5 to 10 mm and a resin binder, said vulcanized rubber layer being a vulcanized molding of an unvulcanized rubber layer, wherein the elastic chips are fixedly bonded to one another with the resin binder and the powdery rubber-containing layer is adhered to the vulcanized rubber layer when the mixture layer and the unvulcanized rubber layer are subjected to pressurization and vulcanization. The invention also relates to a process for producing the same.

The present invention clarified the causes warping the upper layer portions of the elastic blocks when used for a long time, and overcomes the warping problems of the elastic blocks by removing those causes.

The above and other objects, features and advantages of the invention will be appreciated upon reading of the following description of the invention when taken in conjunction with the attached drawings, with the understanding that some modifications, variations and changes of the invention could be easily made by the skilled person in the art.

BRIEF DESCRIPTION OF THE DRAWINGS

For a better understanding of the invention, reference is made to the attached drawings, wherein.

DETAILED DESCRIPTION OF THE INVENTION

Figure 1:
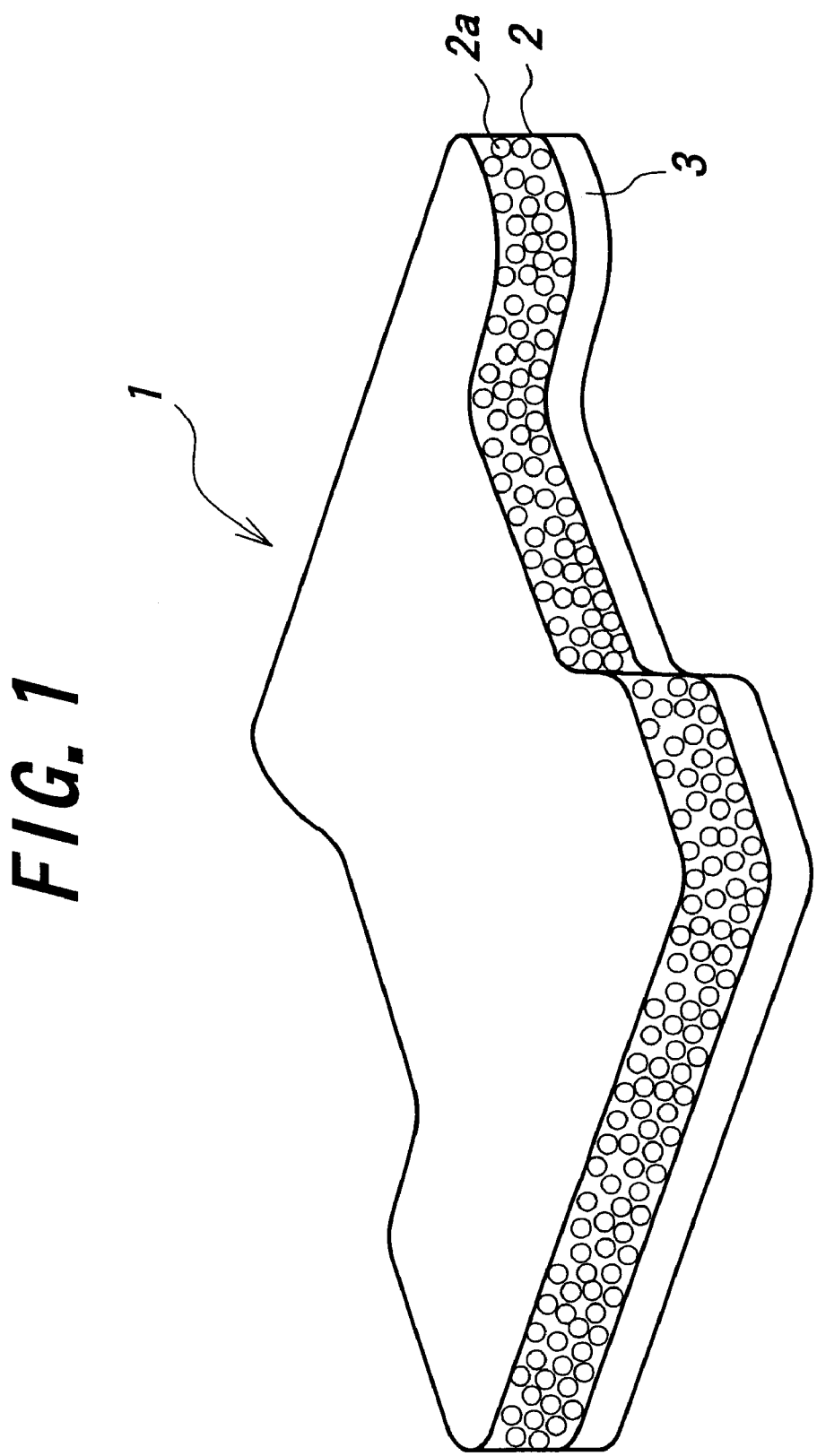
FIG. 1 is a perspective view of an embodiment of the elastic block according to the present invention.

In the following, the present invention will be explained in more detail.

In order to prevent elastic blocks from being warped, the present inventors tried to various means for firmly bond the elastic blocks to underlying bases.

However, inventors' investigations revealed that when the elastic blocks were entirely bound to the base, they upwardly warped at their edge portions during the long-term use to conspicuously deteriorate the appearance and form steps at 5 mm or more.

The present inventors discovered that even when the elastic blocks were entirely bound to the base, the adhesion between them decreased during the long-term use, and consequently the warping of the elastic blocks could not be suppressed. Further, it was clarified that the entire bonding caused poor constructionability, variations in joints in construction, etc., which resulted in practical problems.

In order to prevent the elastic blocks themselves from being warped, the present inventors made further detailed investigations, and found out that the elastic blocks were upwardly warped through expansion of their lower layer portions.

Inventors' investigations revealed that since water stayed on the base during the long-term use, the lower layer portions of the elastic blocks expanded through absorption of the water from the lower layer surfaces, which caused the upper layer portions of the elastic blocks to be upwardly warped.

Under the above knowledge, the present inventors produced various elastic blocks in trial and made strenuously studies to prevent the upward warping of the elastic blocks and to obtain elastic blocks having high safety and constructionability.

As a result, the present inventors discovered that the below elastic block can be stably prevented from being upwardly warped for an long time, that is, the elastic block being a laminate composed of a powdery rubber-containing layer and a vulcanized rubber layer underlying the powdery rubber-containing layer, said powdery rubber-containing layer being a compression molded layer in which elastic chips are the particle size of 0.5 to 10 mm and a resin binder, said vulcanized rubber layer being a vulcanized, molded layer of an unvulcanized rubber layer, wherein the powdery rubber-containing layer is adhered to the vulcanized rubber layer when the mixture layer and the unvulcanized rubber layer are subjected to pressurization and heating.

In elastic body of the present invention, the powdery rubber-containing layer is adhered to the vulcanized rubber layer and held by the vulcanized rubber layer. Therefore, even if water enters the powdery rubber-containing layer and stays in a lower portion of the powdery rubber-containing layer, the expansion of the powdery rubber-containing layer is suppressed to prevent the elastic block from being warped.

In the elastic body of the present invention, since the powdery rubber-containing layer is integrated with the vulcanized rubber, the elastic block can exhibit excellent dimension stability over an extended time period. Further, the elastic body does not warp or change its deformability even after being paved, while maintaining water drainage. Consequently, the elastic block can sufficiently exhibit its functions to prevent slippage, absorb impacts, and ensure safety.

Furthermore, since the elastic block according to the present invention can prevent itself from being upwardly warped even during the long-term use, it needs not be bonded to the underlying base over its entire surface, so that the elastic block can be easily located and tentatively bonded to attain excellent constructionability.

Since the elastic blocks according to the present invention are prevented from being warped over the long time period, they do not deteriorate the appearance of the elastically paved roads, etc. or form steps due to warping. Therefore, the elastic blocks can offer an elastically paved structure capable of preventing stumbling, falling, etc. and exhibiting high safety.

(1) Powdery Rubber-Containing Layer

The powdery rubber-containing layer is a compression molded layer composed of a mixture comprising elastic chips having the particle size of 0.5 to 10 mm preferably 1 to 3 mm, and a resin binder. The thickness of the powdery rubber-containing layer is not restrictive, but generally is preferably 10 to 20 mm. At that time, the thickness of the vulcanized rubber layer is preferably not less than 5 mm.

(1-1) Elastic Chips

The elastic chips may be elastic chips made of a rubbery material or an urethane-based elastomer. In the present invention, as such elastic chips, particularly vulcanized chips, which can maintain given elasticity irrespective of changes in temperature, are preferably used.

As vulcanized rubber chips, rubbery powders obtained particularly from used vulcanized rubbers recovered, such as used tires, are preferably used from the viewpoint of effectively utilizing the natural resources.

Further, vulcanized rubber chips, which are obtained by adding a vulcanizing agent, a filler, a pigment, etc. into fresh rubber, kneading and vulcanizing the mixture and grinding the vulcanized mixture may be used as the vulcanized rubber chips. In particular, the vulcanized rubber chips to be used in a front-surface portion of the powdery rubber layer of the elastic block are preferably made of ethylene-propylene-diene terpolymer (EPDM).

(1-2) Aggregate

According to the present invention, an aggregate may be incorporated into the powdery rubber-containing layer. As such an aggregate, an aggregate such as small stones having sizes of around 5 mm may be recited. When such small stones are compounded into the powdery rubber-containing layer, the powdery rubber-containing layer may be molded with use of a smaller amount of the binder, which can reduce the cost.

(1-3) Binder

According to the present invention, such elastic chips and additionally aggregate are fixedly bound to one another with an appropriate binder. As such a binder, a polyurethane binder is particularly preferred. Since the polyurethane-based binder has excellent elongation and strength, the binder affords wear resistance.

Such a polyurethane-based binder may be obtained by reacting an appropriate polyfunctional isocyanate with an appropriate polyfunctional alcohol. For example, as the polyfunctional isocyanate, trilenediisocyanate (TDI) and diphenylmethane diisocyanate (MDI) may be recited, and as the polyfunctional alcohol, polypropyrene glycohol (PPG) and polyethylene glycohol (PEG) may be recited.

In the present invention, 100 parts by weight of the elastic chips are preferably bonded to one another with 5 to 30 parts by weight of at least one kind of a resin binder selected from the group consisting of the urethane resin and a liquid polybutadiene rubber. As the resin binder, polyurethane-based binder, polybutadiene-based binder, polysulfide rubber-based binder, silicone rubber-based binder, etc. are recited. Among them, polyurethane-based binder is preferred.

If the resin binder is less than 5 parts by weight, it is not enough to fully bind the elastic chips in the powdery rubber-containing layer, whereas more than 30 parts by weight unfavorably results in a higher cost.

(1-4) Curing Agent for Polyurethane Resin

According to the present invention, as the resin binder of the powdery rubber-containing layer, use may be made of a one-liquid type curing agent which is curable with moisture and a two-liquid type curing binder in which a polyol-based curing agent, a polyamine curing agent, etc. are cured in combination.

The powdery rubber-containing layer may comprise a plurality of powdery rubber-containing layers, for example, two upper and lower powdery rubber-containing layers. These plural powdery rubber-containing layers may contain the same kind of elastic chips or different kinds of elastic chips at the same compounding ratio or different mixing ratios. For example, the compounding ratio of the elastic chips may be so changed that the upper powdery rubber can afford a smoother surface and high mechanical strength and more effectively absorb impact. The particle size of the elastic chips in the upper powdery rubber-containing layer may be smaller than the underlying powdery rubber-containing layer(s) for similar purposes as mentioned above.

In this case, another vulcanized rubber layer may be interposed between the adjacent powdery rubber layers. Such a construction further strengthens the mechanical strength of the elastic block.

In the elastic block according to the present invention, an antioxidant, a UV ray absorber, a pigment, etc. may be incorporated into a front-surface powdery rubber-containing layer. If the pigment or the like is used, the powdery rubber-containing layer can be colored to a desired color.

The powdery rubber-containing layer is an elastic layer having the elastic chips fixedly bound to one another with the resin binder, and possesses water permeability due to voids defined among the elastic chips bonded to one another with the resin binder.

In the elastic block according to the present invention, the bulk density of the powdery rubber-containing layer is preferably 0.7 to 1.5 g/cm$^3$. If it is less than 0.7 g/cm$^3$, durability becomes a problem, whereas more than 1.5 g/cm$^3$ deteriorates the elastic function.

(2) Vulcanized Rubber Layer
(2-1) Unvulcanized Rubber

In the unvulcanized rubber layer, natural rubber, butyl rubber, styrene-butadiene rubber, butadiene rubber, ethylene-propylene rubber, chlorosulfonated polyethylene rubber, etc. may be used singly or in a mixed state. The thickness of the vulcanized rubber layer is not restrictive, but generally may be is preferably not less than 5 mm.

(2-2) Additives

Into the above rubber, a softener, a vulcanizer, a vulcanization accelerator, a filler, a coloring matter, a pigment, a dye, an anti-aging agent, other compounding agent, etc. may be incorporated, and the mixture can be molded to a sheet-shaped unvulcanized rubber layer in the present invention by press rolling with use of a calendar.

According to the elastic block of the present invention, the thickness of the vulcanized rubber layer is 5 to 60% of that of the elastic block. If it is less than 5%, the upward warping of the unvulcanized rubber layer in the present invention is insufficient, whereas if the thickness of the vulcanized rubber layer exceeds beyond 60%, the warping of the elastic block cannot be suppressed any more, and to the contrary the water permeability of the elastic block is interrupted.

The elastic block may take any planar shape selected from a square, a rectangular shape, a polygonal shape, an elliptical shape, a round shape, a rhombic shape, a wavy shape, etc. as well as various three-dimensional shapes including designs.

According to the present invention, (1) elastic chips are added and mixed into a resin binder together with appropriate additives such as a pigments, (2) a layer of the mixture is obtained for a powdery rubber-containing layer, (3) a laminate of this mixture layer and a layer of an unvulcanized rubber is prepared and placed in a mold, (4) the mixture layer is compression molded, and simultaneously the unvulcanized rubber layer is compression molded during vulcanization, and (5) the resultant product is released from the mold, thereby giving an elastic block.

In this elastic block, the non-reacted ingredient in the mixture layer reacts with that of the unvulcanized rubber layer at their boundary portion, so that the powdery rubber-containing layer is adhered to the vulcanized rubber layer to prevent the warping of the elastic block.

Figure 6:
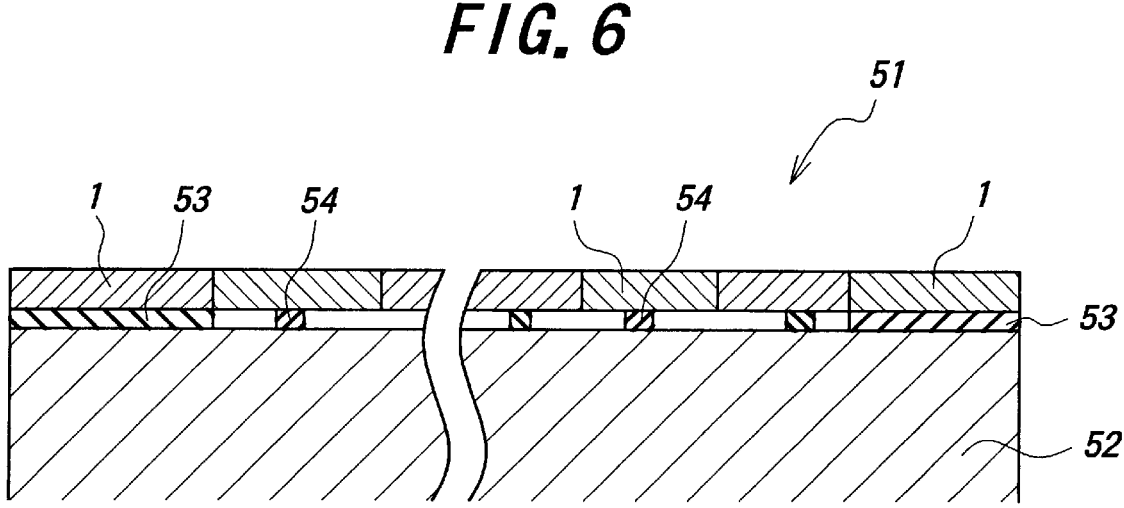
FIG. 6 is a sectional view of a paved road using the elastic blocks according to the present invention.
Figure 7:
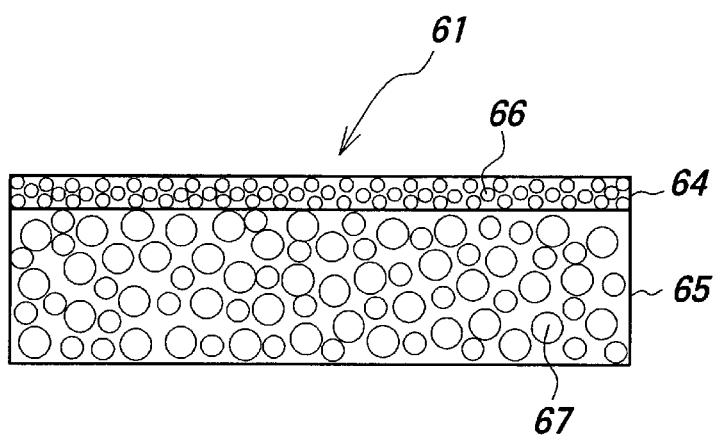
FIG. 7 is a sectional view of a conventional block.

A elastically paved structure is constructed by preferably closely paving the elastic blocks according to the present invention on an underlying base in such a manner that some of the elastic blocks are bound to the upper surface of the base with an adhesive over their entire surfaces, and the other only partly bound to the base with the adhesive. For example, as shown in FIG. 6, the elastic blocks 1 located at opposite sides may be bound to the upper surface of the base 52 with an adhesive 53 over their entire rear surfaces, and the other between the elastic blocks at the opposite sides only partly bound to the base 52 with the adhesive 54 applied to parts of their rear surfaces.

In the elastic blocks according to the present invention, the powdery rubber-containing layer is integrated with the vulcanized rubber layer, so that the elastic blocks have high dimensional stability even under exposure to water over a long time period, are free from deformation such as warping, and therefore need not be bound to the base over their entire surfaces.

Particularly, it may be that when the elastic blocks according to the present invention are to be interlocked with one another, those at the side portions where the elastic blocks are more likely to be turned up or peeled are bound to the underlying base over their entire surfaces, whereas those in the other area are spot-bounded or partially, for example, linearly bound with the underlying base. Therefore, the elastic blocks according to the present invention have excellent constructionability.

Further, since all of the elastic blocks need not be bound to the underlying base over their entire surfaces, they can be easily exchanged for repairment or for replacement due to design change.

Furthermore, since the elastic blocks according to the present invention do not warp, the paved structure does not cause pedestrians to stumble during walking, with the result that the turning up or peeling of the elastic blocks are not induced by such stumbling.

Therefore, the elastic blocks according to the present invention mitigate impact loads upon pedestrians' feet and legs, reduce fatigue feeling, decrease noise, and increase slip resistance at low-temperature and highly humid condition to give rise to difficult slippage on walking with extremely high safety. Further, even if a pedestrian falls on walking, an influence upon his or her human body can be reduce. Moreover, since the powdery rubber-containing layer penetrates water, the elastic floor having good drainage can be constructed. Thus, the elastic blocks according to the present invention can exhibit their inherent functions over a long time period.

PREFERRED EMBODIMENTS OF THE INVENTION

The present invention will be explained in more detail with reference to the drawings.

Figure 2:
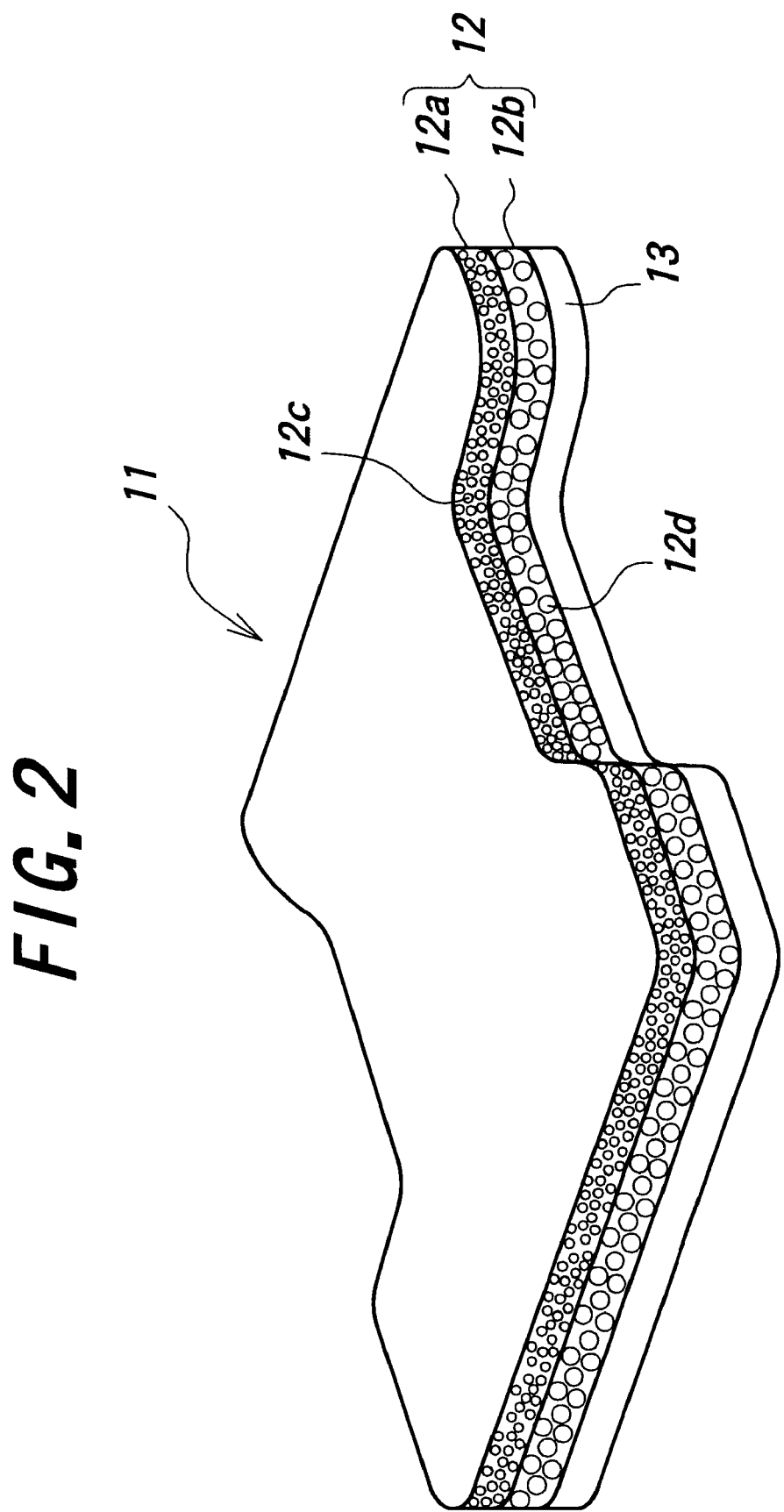
FIG. 2 is a perspective view of another embodiment of the elastic block according to the present invention.
Figure 3:
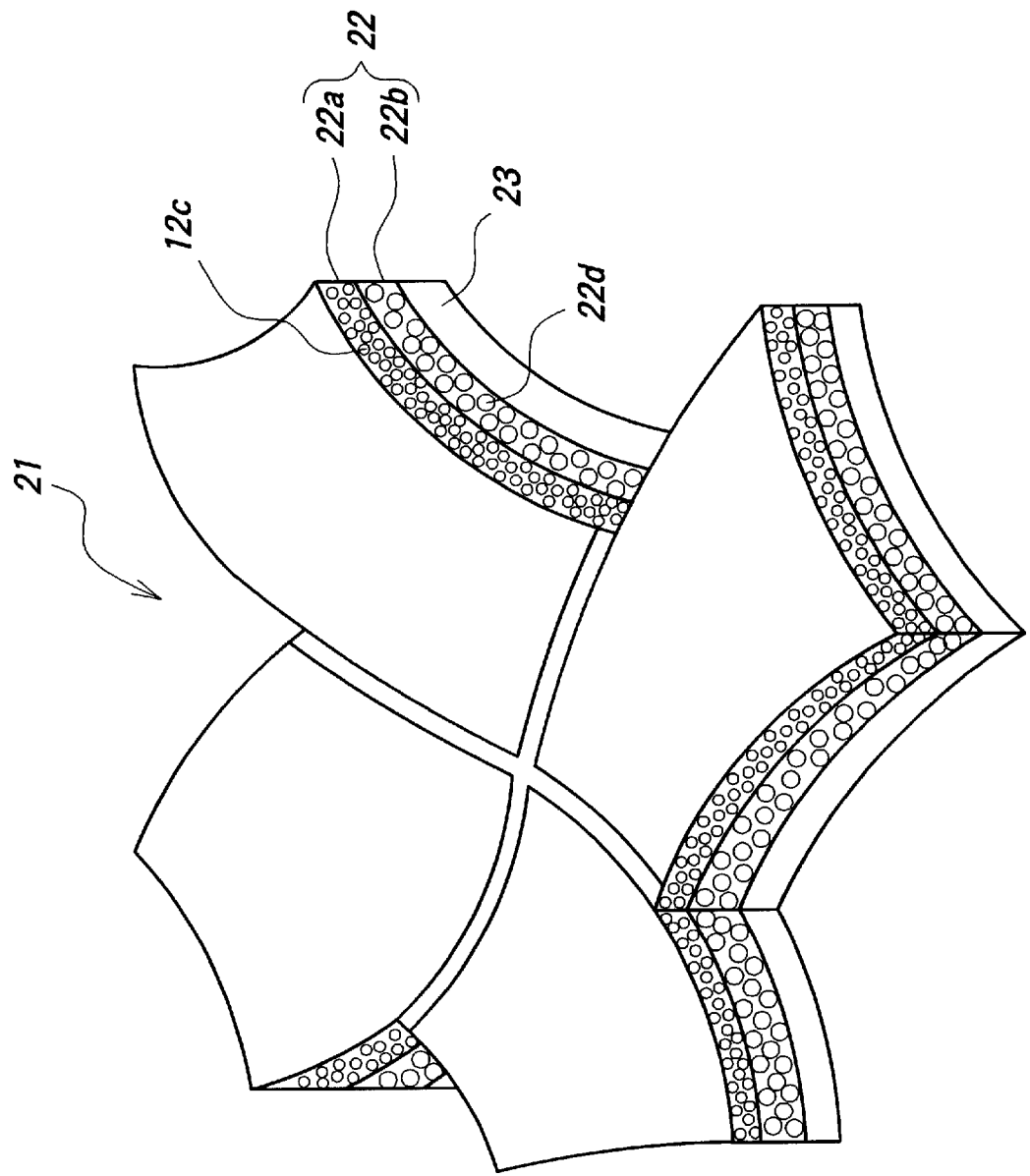
FIG. 3 is a sectional view of a further embodiment of the elastic block according to the present invention.
Figure 4:
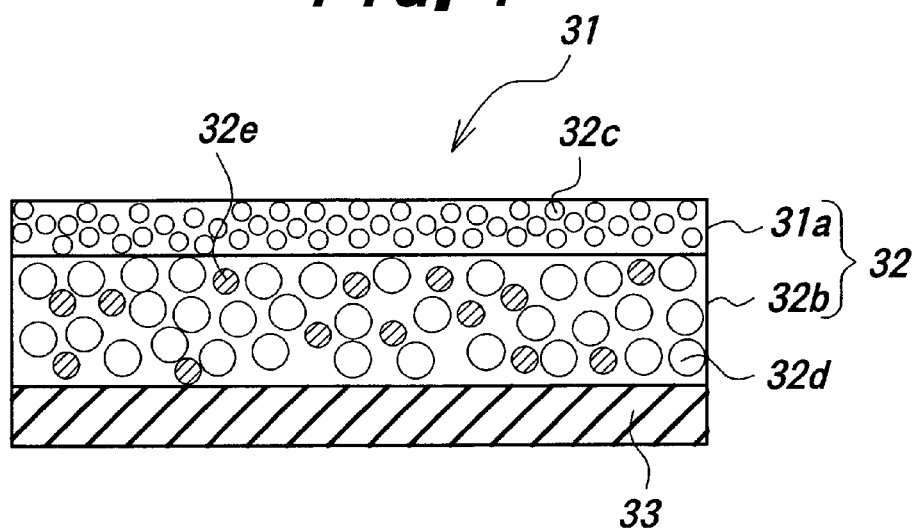
FIG. 4 is a view of a still further embodiment of the elastic block according to the present invention.
Figure 5:
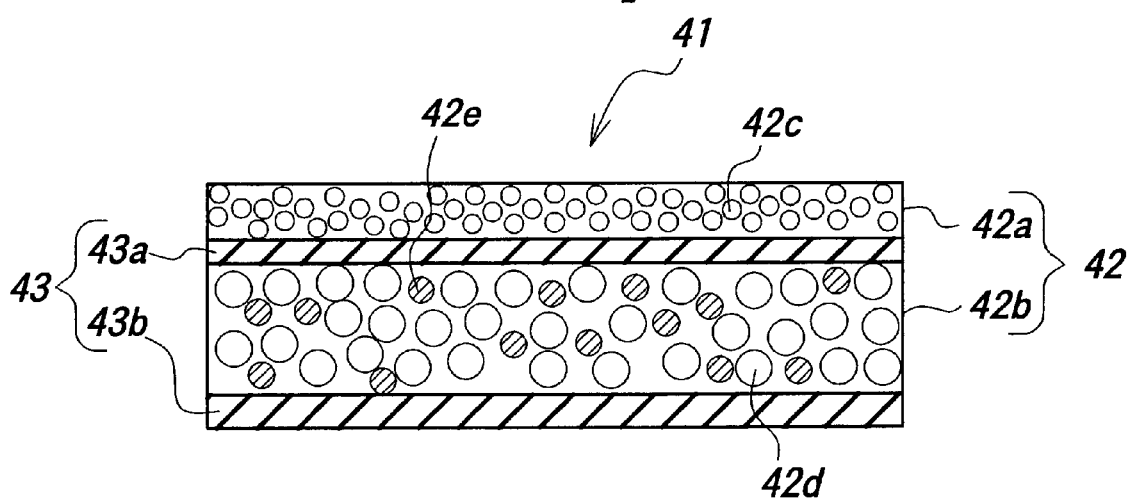
FIG. 5 is a view of a still further embodiment of the elastic block according to the present invention.

FIG. 2 is a perspective view of an embodiment of the elastic block according to the present invention. FIG. 3 is a perspective view of another embodiment of the elastic block according to the present invention. FIG. 4 is a sectional view of a further embodiment of the elastic block according to the present invention. FIG. 5 is a view of a still further embodiment of the elastic block according to the present invention. FIG. 6 is a sectional view of a paved road using the elastic blocks according to the present invention.

The elastic blocks according to the present invention, which comprise elastic bodies, are to be paved on an underlying base to absorb impacts.

The elastic block 1 shown in FIG. 2 have a rectangular shape with a throttled middle portion, and comprises a laminate of a powdery rubber-containing layer 12 and a vulcanized rubber layer 13 integrally underlying the powdery rubber-containing layer 12.

In this embodiment, the powdery rubber-containing layer 12 comprises an upper powdery layer 12*a* containing elastic chips 12*c* and a lower powdery layer 12*b* containing elastic chips 12*d*. Although the particle size of the elastic chips 12*c* and 12*d* fall in a range of 0.5 to 10 mm, the average particle diameter of the elastic chips 12*c* is smaller than that of the elastic chips 12*d*. Alternatively, the particle size of the elastic chips 12*c* may be substantially equal to that of the elastic chips 12*d*. For example, the particle size of the elastic block is 1 to 3 mm. The reason why the powdery rubber-containing layer 12 comprises the upper and lower powdery rubber-containing layers like this is that this embodiment can ensure a smoother surface and a more impact-absorbing effect. The powdery rubbery layer is not limited to not only one integral type but also such a two-layer type, the powdery rubber-containing layer may be any plural(three, . . . )-layer type.

In the embodiment, the elastic chips 12*c* and 12*d* are vulcanized rubber chips, and each kind of the elastic chips 12*c* and 12*d* is mixed with a resin binder to form a layer of the mixture. The two mixture layers are laminated together with the unvulcanized rubber layer as shown in FIG. 2, and the laminate is placed in a mold where the two mixture layers are bonded together and compression molded into the powdery rubber-containing layer, and the elastic chips are fixedly bonded together with the resin binder.

In the elastic block 11, the powdery rubber-containing layer 12 is adhered to the vulcanized rubber layer 13 under compression and heating treatment. The upper powdery rubber-containing layer is bonded to the lower powdery rubber-containing layer under heating with pressure inside the mold.

FIG. 3 is a perspective view of another embodiment of the elastic block according to the present invention. This embodiment merely differs from that in FIG. 2 in that it has a unique crossing shape having a curved crossing design. Therefore, detailed explanation on this embodiment is omitted for simplification. Reference numerals 21, 22 (22*a*, 22*b*, 22*c*, 22*d*) and 23 in FIG. 3 correspond to 11, 12 (12*a*, 12*b*, 12*c*, 12*d*) and 13 in FIG. 2, respectively.

FIG. 4 is a sectional view of a further embodiment of the elastic block according to the present invention, which is structurally similar to those shown in FIGS. 2 and 3. The elastic block in FIG. 4 differs from those shown in FIGS. 2 and 3 in that the elastic chips 32*d* and the aggregate 32*e* are incorporated in a lower powdery rubber-containing layer 32*b*, the elastic chips 32*d* and 32*e* having the respective particle sizes greater than that of elastic chips 32*c* in an upper powdery rubber-containing layer 32*a*. Reference numerals 31, 32 (32*a*, 32*b*, 32*c*, 33*d* & 32*e*) and 33 correspond to 11, 12 (12*a*, 12*b*, 12*c*, 12*d*) and 13 in FIG. 2, respectively. Therefore, detailed explanation of the embodiment in FIG. 4 is omitted for avoiding overlapping explanation with FIG. 2.

FIG. 5 is a still further embodiment of the elastic block according to the present invention which differs from that of FIG. 4 in that two vulcanized rubber layer 43*a* and 43*b* are provided in the state that a first one 43*a* is interposed between a front-surface powdery rubber-containing layer 42*a* and an internal powdery rubber-containing layer 42*b*, and a second one 43*b* is arranged at the rear-surface side of the internal powdery rubber-containing layer 42*b*. The reason why two vulcanized rubber layers are provided is that such vulcanized rubber layers can further increase the strength of the elastic back and further prevent upward warping of the elastic block. Reference numerals 41, 42 (42*a*, 42*b*, 42*c*, 42*d* & 42*e*) and 43 (43*a*, 43*b*) correspond to 11, 12 (12*a*, 12*b*, 12*c*, 12*d*) and 13 in FIG. 2, respectively. Therefore, detailed explanation of the embodiment in FIG. 5 is omitted for avoiding overlapping explanation with that in FIG. 2.

As understood from the above explanation, the elastic block according to the present invention is constructed such that one or more powdery rubber-containing layers and one or more vulcanized rubber layers are laminated in the state that one powdery rubber-containing layer is to be located at a front surface side, whereas one vulcanized rubber layer is to be placed on the base.

EXAMPLES

The present invention will be explained in more detail with reference to the following examples.

Example 1

An elastic block as shown in FIGS. 2 and 3 was produced.

First, 10 parts by weight of a polyurethane-based binder and 3 parts by weight of a pigment were mixed into 100 parts by weight of vulcanized rubber chips obtained by grinding a tire at the particle size of 1 to 3 mm, thereby obtaining a 5 mm-thick layer of the mixture for an upper powdery rubber-containing layer.

On the other hand, 10 parts by weight of a polyurethane-based binder was mixed into 100 parts by weight of vulcanized rubber chips obtained by grinding a tire at the particle size of 0.5 to 10 mm, thereby obtaining a 14 mm-thick layer of the mixture for a lower powdery rubber-containing layer.

Further, natural rubber and butyl rubber (NR+IIR=50 wt %+50 wt %) were kneaded, a softening agent, a vulcanizer, a pigment and other additive (antioxidant) were mixed into the kneaded rubber, and the mixture was rolled into an unvulcanized rubber sheet (1 mm thickness) with a calendar.

The unvulcanized rubber sheet, the 14 mm-thick mixture layer and the 5 mm-thick mixture layer were laminated from the lower side in this order, and placed in a mold. Then, the laminate was subjected to compression molding under heating at 150° C. for 25 minutes, thereby obtaining an elastic block having a brown surface layer. The elastic block had the total thickness of 20 mm with the vulcanized rubber layer being 1 mm thick.

Example 2

Example 2 was effected fundamentally similar to Example 1 except that the thickness of a mixture layer for a lower powdery rubber-containing rubber layer was 18 mm and the thickness of an unvulcanized rubber sheet was 2 mm, thereby obtaining an elastic block with the total thickness of 25 mm. The thickness of the vulcanized rubber of this elastic block was 2 mm.

Example 3

Example 3 was effected fundamentally similar to Example 1 except that the thickness of a mixture layer for a lower powdery rubber-containing rubber layer was 7 mm and the thickness of an unvulcanized rubber sheet was 3 mm, thereby obtaining an elastic block with the total thickness of 15 mm. The thickness of the vulcanized rubber of this elastic block was 3 mm.

Example 4

Example 4 was effected fundamentally similar to Example 1 except that the thickness of a mixture layer for a lower powdery rubber-containing rubber layer was 9 mm and the thickness of an unvulcanized rubber sheet was 6 mm, thereby obtaining an elastic block with the total thickness of 20 mm. The thickness of the vulcanized rubber of this elastic block was 6 mm.

Example 5

Example 5 was effected fundamentally similar to Example 4 except that an unvulcanized rubber sheet was made of styrene-butadiene rubber and butyl rubber (SBR+llR=59 wt %+50 wt %), thereby obtaining an elastic block with the total thickness of 20 mm. The thickness of the vulcanized rubber of this elastic block was 6 mm.

Example 6

Example 6 was effected fundamentally similar to Example 1, thereby producing an elastic block with a single powdery rubber-containing layer.

First, 10 parts by weight of a polyurethane-based binder and 3 parts by weight of a pigment were mixed into 100 parts by weight of vulcanized rubber chips obtained by grinding a tire at the particle size of 0.5 to 10 mm, thereby obtaining a 14 mm-thick layer.

Then, similarly to Example 4, an unvulcanized rubber sheet (6 mm thickness) was produced from styrene-butadiene rubber and butyl rubber (SBR+llR=50 wt %+50 wt %).

Similarly to Example 1, the mixture layer was laminated on the unvulcanized rubber sheet, from the lower side in this order, and the laminate was placed in a mold. Then, the laminate was subjected to compression molding under heating at 150° C. for 25 minutes, thereby obtaining an elastic block having a brown surface layer with the total thickness of 20 mm. The vulcanized rubber layer of the elastic block is 6 mm thick.

Example 7

Example 7 was effected fundamentally similar to Example 1 except that the thickness of a mixture layer for a lower powdery rubber-containing rubber layer was 19 mm and the thickness of an unvulcanized rubber sheet was 1 mm, thereby obtaining an elastic block with the total thickness of 25 mm. The thickness of the vulcanized rubber of this elastic block was 1 mm.

Example 8

Example 8 was effected fundamentally similar to Example 1 except that the thickness of a mixture layer for a lower powdery rubber-containing rubber layer was 6 mm and the thickness of an unvulcanized rubber sheet was 9 mm, thereby obtaining an elastic block with the total thickness of 15 mm. The thickness of the vulcanized rubber of this elastic block was 9 mm.

Example 9

Example 9 was effected fundamentally similar to Example 3 except that an unvulcanized rubber sheet was made of natural rubber, thereby obtaining an elastic block with the total thickness of 15 mm. The thickness of the vulcanized rubber of this elastic block was 3 mm.

Comparative Example 1

Comparative Example 1 was effected fundamentally similar to Example 1 except that the thickness of a mixture layer for a lower powdery rubber-containing rubber layer was 15 mm and no unvulcanized rubber sheet was used thereby obtaining a block with the total thickness of 30 mm.

After lower surface portions of the elastic blocks in Examples 1 to 9 and that of the block in Comparative Example 1 were immersed in warm water at 40° C. for one month, their warped degrees were measured.

Further, as shown in FIG. 6, the elastic blocks in Examples 1 to 9 and the blocks in Comparative Example 1 were paved on outdoor concrete floors, respectively, and occurrence degrees of steps between the adjacent blocks were examined.

Further, the bound states of the powdery rubber-containing layers and the vulcanized rubber layers were confirmed.

Test Methods (1) Test for Warping at side Portions

An unvulcanized rubber sheet was laminated upon a powdery rubber-containing layer as a base layer, and the laminated layers were simultaneously subjected to vulcanization molding. Then, the vulcanized molded laminate was subjected to a warping promotion test. Test condition was that the vulcanized rubber layer was immersed in warm water at 40° C. for one month, and then the warped state of the laminate was measured.

The measured values were evaluated as ⊚, ○ and x, respectively. ⊚ denotes that the upward warping was 0 or minus (downward warping). ○ denotes that the upward warping was 1 to 2 mm. x denotes that the upward warping was more than 2 mm.

(2) Steps Between the Blocks

The blocks were paved on the outdoor concrete floor, and the stepped degree was examined between the blocks one month later.

(3) Evaluation From the Cost Viewpoint

○ denotes that the elastic block was inexpensive, and x denotes that the elastic block was expensive.

(4) Bound State Between the Powdery Rubber Layer and the Vulcanized Rubber Layer The bound state between the powdery rubber layer and the vulcanized rubber layer was confirmed "Vulcanized Rubber Adhesion Test Method".

⊚ denotes that the adhered force was more than 2 N/25 mm. ○ denotes that the adhered force was 1 to 2 N/25 mm. x denotes that the adhered force was less than 1 N/mm.

Results are shown in Tables 1 (1-1 & 1-2) and 2 (2-1 & 2-2). Table 1 gives thicknesses of the respective layers in Examples 1 to 9 and Comparative Example 1.

TABLE 1(1)

|  | Example 1 | Example 2 | Example 3 | Example 4 | Example 5 |
|---|---|---|---|---|---|
| Thickness of front-surface layer of powdery (unit: mm) | 5 | 5 | 5 | 5 | 5 |
| Thickness of layer of powdery (unit: mm) | 14 | 18 | 7 | 9 | 9 |
| Thickness of vulcanized rubber layer (unit: mm) | 1 | 2 | 3 | 6 | 6 |
| Total thickness of elastic block (unit: mm) | 20 | 25 | 15 | 20 | 20 |
| Thickness percentage of vulcanized rubber layer | 5% | 8% | 20% | 30% | 30% |

TABLE 1(2)

|  | Example 6 | Example 7 | Example 8 | Example 9 | Comparative Example 1 |
|---|---|---|---|---|---|
| Thickness of front-surface layer of powdery (unit: mm) | 14 | 5 | 6 | 5 | 5 |
| Thickness of layer of powdery (unit: mm) | 0 | 19 | 0 | 7 | 15 |
| Thickness of vulcanized rubber layer (unit: mm) | 6 | 1 | 9 | 3 | 0 |
| Total thickness of elastic block (unit: mm) | 20 | 25 | 15 | 15 | 20 |
| Thickness percentage of vulcanized rubber layer | 30% | 4% | 60% | 20% | 0% |

TABLE 2(1)

|  | Example 1 | Example 2 | Example 3 | Example 4 | Example 5 |
|---|---|---|---|---|---|
| Thickness percentage of vulcanized rubber layer | 5% | 8% | 20% | 30% | 30% |
| Upward warping of side portion (unit: mm) | 0 | −0.1 | −0.3 | −0.5 | −0.5 |
| Evaluation | ⊚ | ⊚ | ⊚ | ⊚ | ⊚ |
| Step between blocks (unit: mm) | 0 | 0 | 0 | 0 | 0 |
| Evaluation | ○ | ○ | ○ | ○ | ○ |
| Price | ○ inexpensive | ○ inexpensive | ○ inexpensive | ○ inexpensive | ○ inexpensive |
| Adhered state between powdery rubber layer and vulcanized rubber layer | ⊚ | ⊚ | ⊚ | ⊚ | ⊚ |

TABLE 2(2)

|  | Example 6 | Example 7 | Example 8 | Example 9 | Comparative Example 1 |
|---|---|---|---|---|---|
| Thickness percentage of vulcanized rubber layer | 30% | 4% | 60% | 20% | 0% |
| Upward warping of side portion (unit: mm) | −0.7 | 2 | −1.0 | 0 | 5.5 |
| Evaluation | ⊚ | ○ | ⊚ | ⊚ | X |
| Step between blocks (unit: mm) | 0 | 2 | 0 | 0 | 5.5 |
| Evaluation | ○ | Δ | ○ | ○ | X |
| Price | ○ inexpensive | ○ inexpensive | X expensive | ○ inexpensive | ○ inexpensive |
| Adhered state between powdery rubber layer and vulcanized rubber layer | ⊚ | ⊚ | ⊚ | ○ | — |

As clear from the results in Table 2, upward warping at edge portions were more suppressed with more reduced interblock steps in the elastic blocks in Examples 1 to 9 as compared with Comparative Example 1.

Further, even when the thickness of the vulcanized rubber layer is not more than 60%, warping can be sufficiently suppressed in the elastic blocks according to the present invention, so that the elastic blocks can be produced at a low cost.

Furthermore, when the butyl rubber is incorporated into the vulcanized rubber layer, more excellent bondability can be ensured between the vulcanized rubber layer and the powdery rubber-containing layer.

What is claimed is:

1. An elastic block adapted to be paved on an underlying base for absorbing impacts, said elastic block consisting essentially of a laminate composed of a monolithic powdery rubber-containing layer and a vulcanized rubber layer underlying the powdery rubber-containing layer; said powdery rubber-containing layer being a compression molded layer composed of a mixture comprising elastic chips having a particle size of 0.5 to 10 mm and a resin binder at least 5 parts by weight relative to 100 parts by weight of the elastic chips, and said vulcanized rubber layer, having a thickness of 5–60% of that of the elastic block, being a vulcanized molding of an unvulcanized rubber layer;

wherein the elastic chips are fixedly bonded to one another with the resin binder and the powdery rubber-containing layer is adhered to the vulcanized rubber layer when the mixture layer and the unvulcanized rubber layer are subjected to pressurization and vulcanization; and wherein upward warping is suppressed to less than 2 mm after immersion of a lower surface portion of the elastic block in water at 40° C. for one month.

2. The elastic block set forth in claim 1, wherein the density of the powdery rubber-containing layer is 0.7 to 1.5 g/cm$^3$.

3. The elastic block set forth in claim 1, wherein the resin binder is a polyurethane-based binder.

4. The elastic block set forth in claim 1, wherein the powdery rubber-containing layer comprising a plurality of powdery rubber-containing layers.

5. The elastic block set forth in claim 4, wherein a plurality of powdery rubber-containing layers contain the same elastic chips.

6. The elastic block set forth in claim 4, wherein at least an uppermost layer and an underlying layer of a plurality of the powdery rubber-containing layers contain different kinds of the elastic chips.

7. The elastic block set forth in claim 6, wherein said uppermost layer contains the elastic chips having a particle size smaller than the particle size of the elastic chips of said underlying layer.

8. The elastic block set forth in claim 4, wherein an additional vulcanized rubber layer is interposed between at least one set of adjacent powdery rubber-containing layers.

9. The elastic block set forth in claim 1, wherein the elastic chips are made of rubber or urethane elastic bodies.

10. The elastic block set forth in claim 1, wherein the elastic chips are made of vulcanized rubber chips.

11. The elastic block set forth in claim 1, wherein the powdery rubber-containing layer comprises 100 parts by weight of the elastic chips and 5 to 30 parts by weight of the resin binder.

12. The elastic block set forth in claim 1, wherein an uppermost surface portion of the powdery rubber-containing layer contains at least one additive selected from the group consisting of an antioxidant, a UV ray absorber and a pigment.

13. The elastic block set forth in claim 1, wherein the powdery rubber-containing layer contains an aggregate.

14. The elastic block set forth in claim 1, wherein the vulcanized rubber layer comprises at least one rubber selected from the group consisting of natural rubber, butyl rubber, styrene-butadiene rubber, butadiene rubber, ethylene-propylene rubber and chlorosulfonated polyethylene rubber.

15. The elastic block set forth in claim 1, wherein the vulcanized rubber layer contains at least one additive selected from the group consisting of a softener, a vulcanizer, a vulcanization accelerator, a filler, a coloring matter, a pigment, a dye, and an antioxidant.

16. A method of paving elastic blocks on an underlying base for absorbing impacts, the method comprising the steps of:

providing an underlying base;

arranging two or more of the elastic blocks of claim 1 on said underlying base; and paving the elastic blocks together to form an impact absorbant surface on the underlying base.

17. The elastic block set forth in claim 1, wherein formed said elastic block is shaped to allow placement close to at least another said elastic block, thus enabling paving to form a paved surface on an underlying base for absorbing impacts.

18. The elastic block set forth in claim 1, wherein upward warping of an upper layer portion of the elastic block is prevented after immersion of a lower surface portion of the elastic block in water at 40° C. for one month.

19. An elastic block adapted to be paved on an underlying base for absorbing impacts, said elastic block consisting essentially of a laminate composed of a monolithic powdery rubber-containing layer and a vulcanized rubber layer underlying the powdery rubber-containing layer; said powdery rubber-containing layer being a compression molded layer composed of a mixture comprising elastic chips having a particle size of 0.5 to 10 mm and a resin binder at least 5 parts by weight relative to 100 parts by weight of the elastic chips, and said vulcanized rubber layer, having a thickness of 5–60% of that of the elastic block, being a vulcanized molding of an unvulcanized rubber layer;

wherein the elastic chips are fixedly bonded to one another with the resin binder and the powdery rubber-containing layer is adhered to the vulcanized rubber layer when the mixture layer and the unvulcanized rubber layer are subjected to pressurization and vulcanization; and wherein step formation is suppressed to less than 2 mm after immersion of a lower surface portion of the elastic block in water at 40° C. for one month and paving on outdoor concrete floors.

20. A process for producing an elastic block according to claim 1, said process comprising preparing a laminate of a layer of a mixture comprising elastic chips having the particle size of 0.5 to 10 mm and a resin binder and an unvulcanized rubber layer, placing the laminate into a mold, compressing the mixture layer and simultaneously compressing and vulcanizing the unvulcanized rubber layer, thereby producing the elastic block comprising the laminate composed of the powdery rubber-containing layer and the vulcanized rubber layer, said powdery rubber-containing layer being the compacted layer of the mixture comprising the elastic chips and the resin binder, said vulcanized rubber layer being a vulcanizate of the unvulcanized rubber layer.

* * * * *